United States Patent [19]
Lee

[11] Patent Number: 5,146,144
[45] Date of Patent: Sep. 8, 1992

[54] ELECTRIC MOTOR
[75] Inventor: James K. Lee, Rochester, N.Y.
[73] Assignee: Eastman Kodak Company, Rochester, N.Y.
[21] Appl. No.: 534,998
[22] Filed: Jun. 8, 1990
[51] Int. Cl.$^5$ .............................. H02K 17/08
[52] U.S. Cl. .................. 318/138; 318/254; 318/439; 388/815; 310/156; 310/268
[58] Field of Search ............ 318/254, 138, 439, 777, 318/776; 310/181, 186, 156, 268, 185; 388/809-815, 930

[56] References Cited
U.S. PATENT DOCUMENTS

| | | |
|---|---|---|
| 300,613 | 6/1884 | Lannert . |
| 3,568,016 | 3/1971 | Barber .................... 318/78 |
| 3,887,854 | 6/1975 | Parks ................. 318/224 A |
| 3,935,519 | 1/1976 | Pfarrer et al. ............... 318/305 |
| 4,041,542 | 8/1977 | Pfarrer et al. ............ 318/171 X |
| 4,066,937 | 1/1978 | Pfarrer et al. ............ 318/221 G |
| 4,167,692 | 9/1979 | Sekiya et al. ................. 318/138 |
| 4,181,867 | 1/1980 | Muller ..................... 310/156 |
| 4,322,665 | 3/1982 | Landgraf ..................... 318/775 |
| 4,371,081 | 2/1983 | Richter ..................... 310/156 |
| 4,459,519 | 7/1984 | Erdman ..................... 318/254 |
| 4,733,115 | 3/1988 | Barone et al. ................ 310/184 |
| 4,743,813 | 5/1988 | Tassinario .................. 318/138 |
| 4,763,403 | 8/1988 | Klein et al. .................. 29/598 |
| 4,785,213 | 11/1988 | Satake ....................... 310/116 |
| 4,922,145 | 5/1990 | Shtipelman .................. 310/156 |

Primary Examiner—William M. Shoop, Jr.
Assistant Examiner—David Martin
Attorney, Agent, or Firm—Robert L. Randall

[57] ABSTRACT

An electric motor is disclosed which is of the brushless D.C. type and comprises a generally planar rotor and a generally planar stator. The rotor is a multipolar permanent magnet, and the stator includes a planar coil having a plurality of windings. In order to provide a motor which can supply a high torque at a relatively low speed and a low torque at a high speed, the stator includes a low speed coil which includes a large number of windings of fine wire and a high speed coil which includes a smaller number of windings of coarse wire.

9 Claims, 4 Drawing Sheets

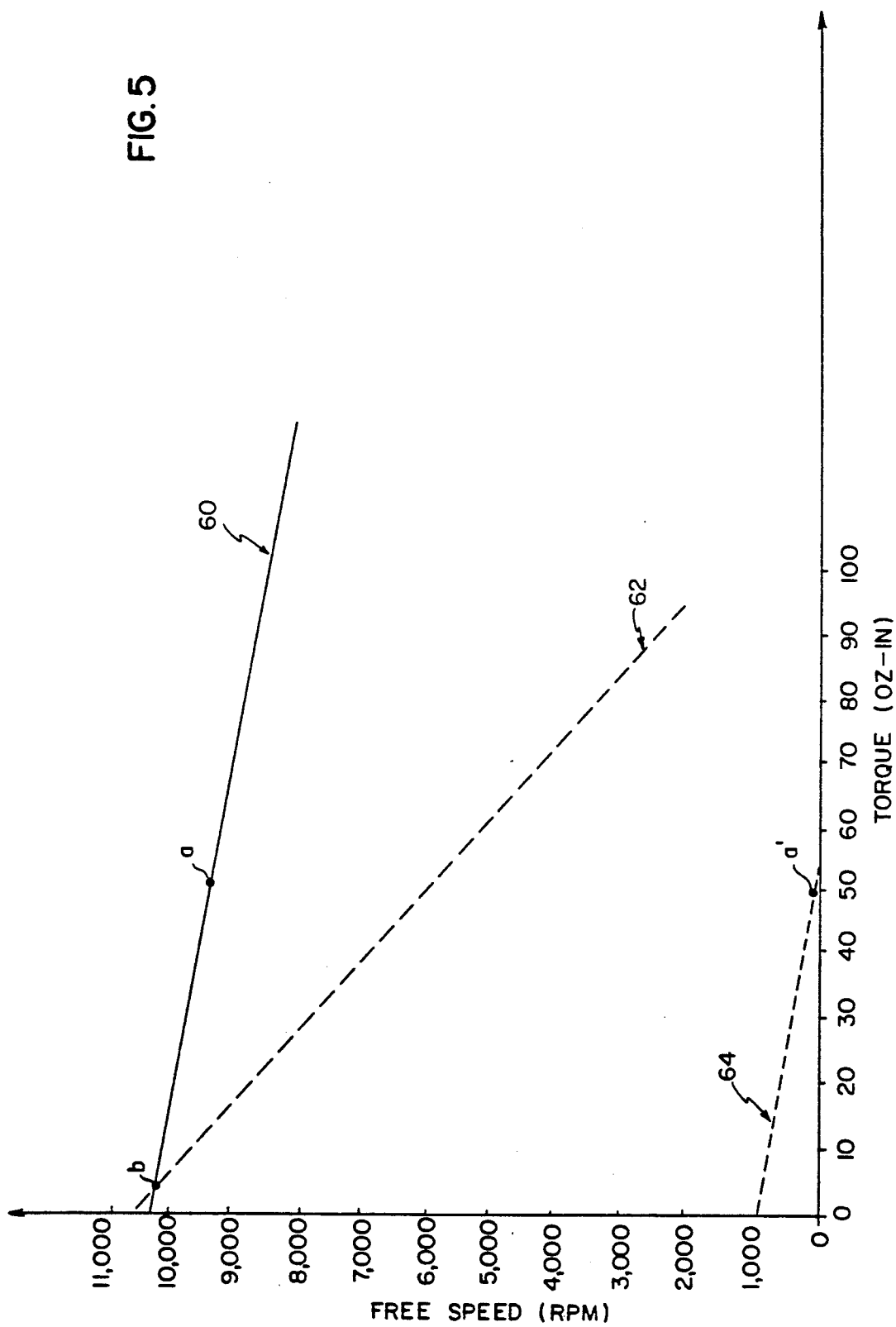

ELECTRIC MOTOR

FIELD OF THE INVENTION

The present invention relates to an electric motor, and more particularly, to a brushless D.C. motor of the planar type.

DESCRIPTION OF THE PRIOR ART

A two speed motor is very desirable for many applications. In an application such as a drum scanner, for example, it is necessary to deliver a high torque at a low speed when film is being loaded onto the drum and a low torque at high speed when the film is being scanned. No single motor performs efficiently at both speeds. Further, a gear box is not desirable since it consumes too much space and flutter is introduced by the gearing. One technique which is used to overcome the multi-speed problem is to wind two motors into one frame, as shown, for example, in U.S. Pat. No. 3,887,854.

U.S. Pat. No. 3,887,854, discloses a multi-speed motor in which auxiliary and main windings are provided on a slotted magnetic core. The auxiliary winding is energized in conjunction with the main winding to provide a starting torque for the motor, and the main winding is energized alone for operation at higher speeds. One problem with a motor of the type shown in the patent is that the salient pole structure in the slotted magnetic core introduces cogging torque which in turn causes high flutter. A further problem is that the motor is too complex and expensive for many applications.

Compact, inexpensive D.C. motors are employed in a wide variety of consumer products. In many such applications, a thin, flat motor is used in order to conserve space. These motors generally have planar coils and permanent magnet rotors. The coils can be wound or they can be formed by printed circuit techniques. The motors are useful in applications in which a multi-speed motor would be advantageous; however, heretofore, there has been no known means for providing such a feature in a planar motor.

SUMMARY OF THE INVENTION

It is an object of the present invention to overcome the problems in the prior art discussed above and to provide an improved electric motor.

In accordance with the present invention, there is provided an electric motor comprising: a rotor adapted to be rotated about an axis, the rotor being a multipolar permanent magnet; a stator axially spaced from the rotor, the stator including a first coil located opposite the rotor and a second coil located opposite the first coil and axially spaced therefrom; and means for providing a drive current to a selected one of the coils.

In one embodiment, the electric motor of the present invention is an axial field brushless D.C. motor. The motor includes a generally planar rotor which is a multipolar permanent magnet and a generally planar stator which is axially spaced from the rotor. The stator includes a first coil on one side of a support and a second coil on an opposite side of the support and axially spaced from the first coil. The first coil includes a high number of turns of fine wire, and it is adapted to be actuated when a low speed and high torque are required. The second coil includes a relatively low number of turns of coarse wire, and the second coil is adapted to be actuated for high speed and low torque. A control means for the motor includes Hall-effect sensors and circuitry for providing a current to the coils in order to drive the motor in the desired mode.

The motor of the present invention has the advantages of a brushless D.C. motor, namely: high reliability, precise speed control, low flutter, and high efficiency. In addition, the present invention provides for multi-speed capability in such a motor. The disclosed motor is compact and can be used in a number of applications where size is critical. A further advantage is that the disclosed arrangement of coils for a multi-speed motor can be manufactured at relatively low cost.

Other features and advantages will become apparent from reference to the following Description of the Preferred Embodiment when read in light of the attached drawings.

BRIEF DESCRIPTION OF THE DRAWINGS

FIG. 5 is a graph in which speed vs torque is plotted for a motor having a single coil and for the two coils in the motor of the present invention.

DESCRIPTION OF THE PREFERRED EMBODIMENT

Figure 2:
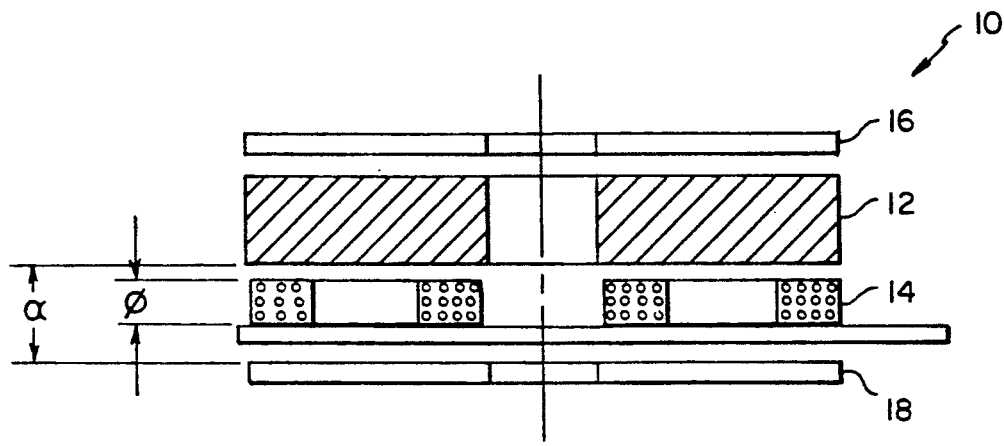
FIG. 2 is a sectional view of a prior-art motor.

With reference to FIG. 2, there is shown a generally planar prior-art motor 10. Motor 10 is a brushless D.C. motor and comprises a multipolar permanent magnet rotor 12 and a generally planar stator coil 14 axially spaced from rotor 12. Flux plates 16 and 18 are located at the two axial extremities of the motor 10. In motor 10, permanent magnet rotor 12 can have an outside diameter of 3.5 inches and a thickness in an axial direction of 0.650 inches, the air gap, designated $a$, can be 0.500 inches, and the thickness of coil 14, designated $\Phi$, can be 0.400 inches. As is well known in the art, when a drive current is supplied to coil 14, the lines of force generated will interact with the lines of force of the permanent magnet rotor 12 to produce a driving force on the rotor 12. A disadvantage of motor 10, however, is that the motor is not suitable for applications in which a high torque is needed at low speeds and a low torque is required at high speeds.

Figure 1:
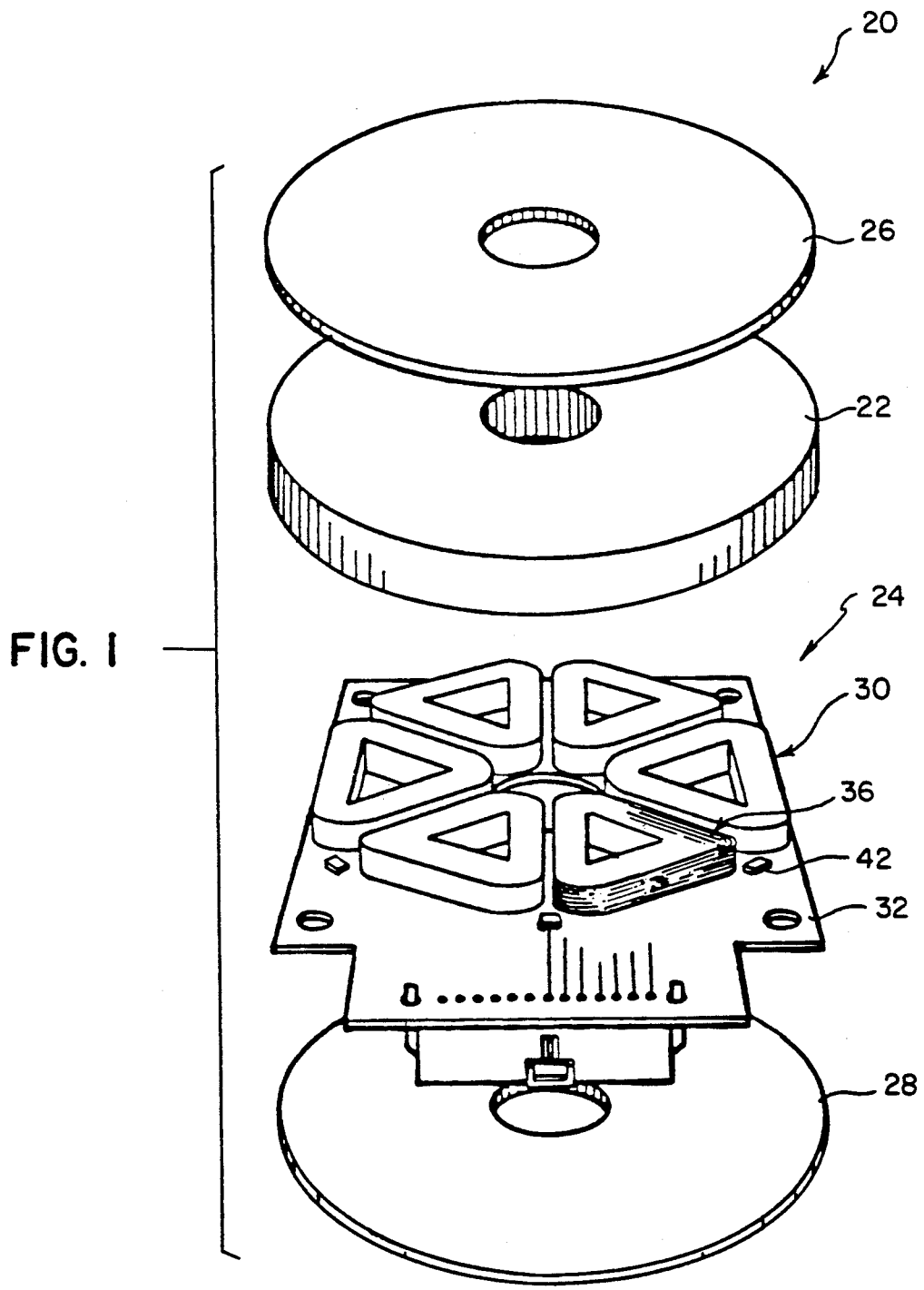
FIG. 1 is an exploded perspective view of the motor of the present invention.
Figure 3:
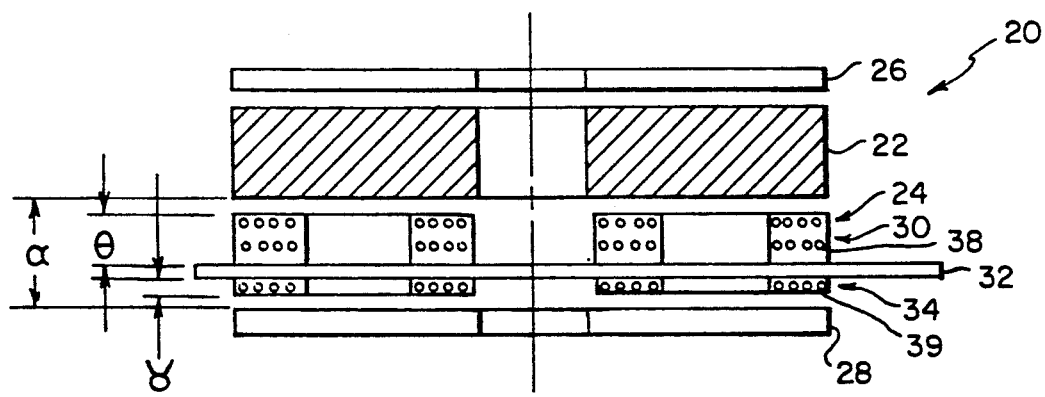
FIG. 3 is a sectional view of the motor of the present invention.

With reference to FIGS. 1 and 3, there is shown a motor 20 constructed in accordance with the present invention. Motor 20, as disclosed herein, is an axial field three-phase brushless D.C. motor; however, the motor could have more or less phases without departing from the teachings of the present invention. Motor 20 comprises a multipolar permanent magnet rotor 22, a stator 24, an upper flux plate 26, and a lower flux plate 28.

Rotor 22 is supported for rotation on, for example, a central shaft (not shown) which is journalled in support structure (not shown). Rotor 22 can include, for example, 8 poles, and the rotor can be made from ceramic 8 which is a designation by the Magnetic Material Producers Association (MMPA) for a particular grade of barium/strontium ferrite.

Stator 24 comprises a low-speed coil 30 mounted on one side of a support 32, which can be a circuit board, and a high-speed coil 34 mounted on an opposite side of support 32, as shown in FIG. 3. Each of the coils 30, 34, includes six windings 36. The poles of rotor 22 (not shown) and the windings 36 of the coils 30, 34, are generally sector shaped so that the flux generated by a pole effectively meets the flux generated by the coil segment. The coils 30, 34, can be formed by printed circuit techniques, as disclosed for example, in U.S. Pat. No. 4,763,403, granted Aug. 16, 1988; however, the coils in motor 20 are preferably wound. Low-speed coil 30 includes a large number of turns of relatively fine wire 38, and high-speed coil 34 has a relatively small number of turns of coarse wire 39. The axial positions of coils 30 and 34 could be reversed from the positions shown in FIGS. 1 and 3; however, in order to obtain the high torque needed when coil 30 is used, it is preferable to have coil 30 located closer to permanent magnet rotor 20.

In one exemplary motor 20, permanent magnet rotor 22 has an outside diameter of 3.5 inches and a thickness in an axial direction of 0.650 inches, the magnetic air gap $\alpha$ is 0.500 inches, coil 30 has a thickness $\Theta$ of 0.350 inches, and coil 34 has a thickness $\gamma$ of 0.050 inches. It will be seen that even though motor 20 includes both a high-speed coil and a low-speed coil, it can be made with an overall thickness which is substantially the same as the prior-art motor 10 described above and shown in FIG. 2.

Figure 4:
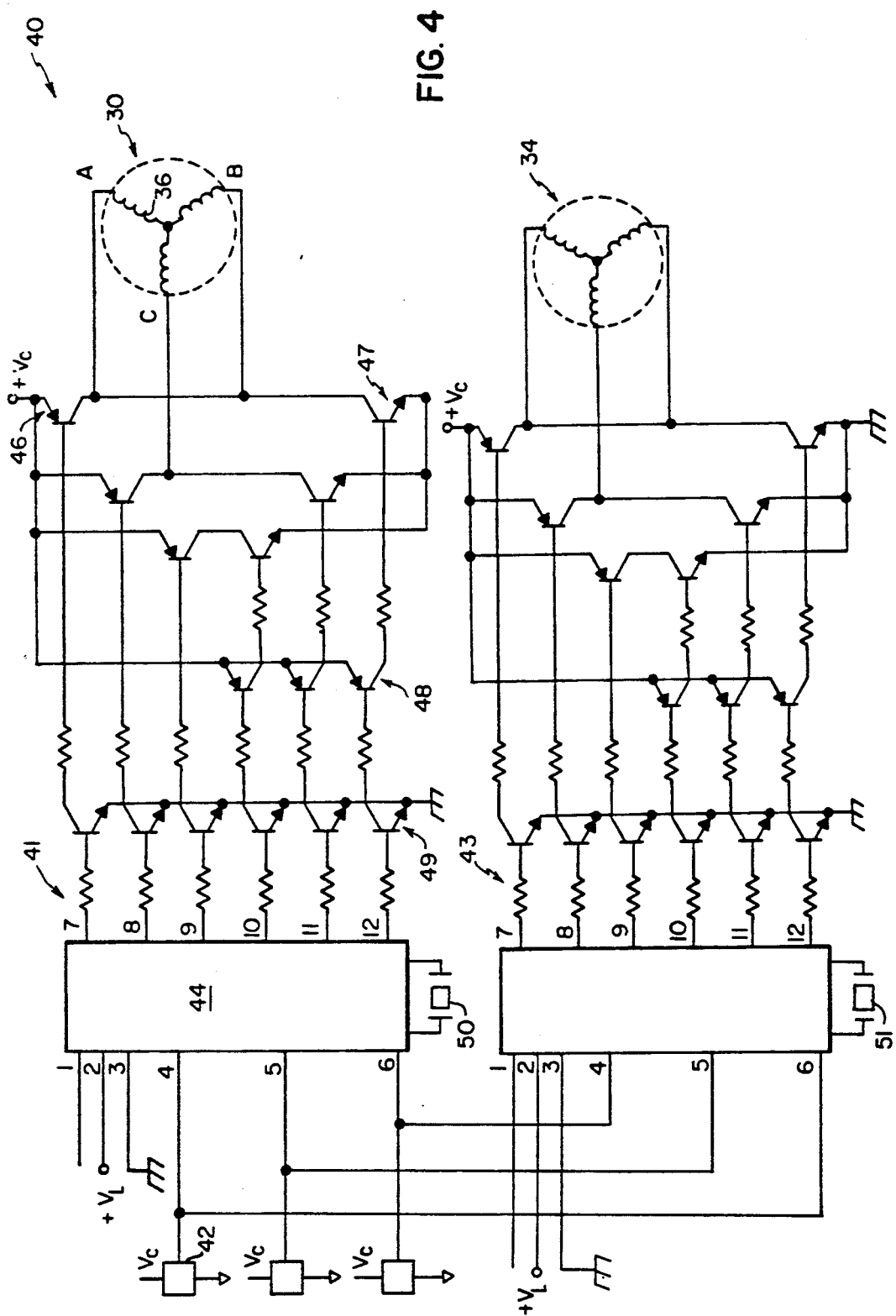
FIG. 4 is a schematic diagram of the drive means for the motor of the present invention.

A drive circuit 40 for motor 20 is shown in FIG. 4. Circuit 40 includes electronic control circuits 41 and 43 which control the low speed coil 30 and the high speed coil 34, respectively, and circuits 41 and 43 are essentially identical. Crystals 50 and 51, however, are different in order to drive motor coils 30 and 34 at the different speeds that are required. Pin 1 in the circuits 41 and 43 is the enable line to the logic level controllers 44. Generally either circuit 41 or circuit 43 is enabled, although both can be driven at the same time for extra power during start-up. During high speed operation, the back-EMF from the low speed coil 30 will, of course, be higher than the power supply voltage; consequently, no power can be delivered to the low speed coil during high speed operation. The reverse breakdown voltage from collector to emitter with the base open will also have to be sufficient to withstand the this back-EMF produced by the low speed coil. Since the two control circuits are essentially identical, only control circuit 41 will be described in detail.

The electronic control circuit 41 is a generic drive circuit for a three phase brushless DC motor. During operation, one of the upper PNP power transistors 46 is turned on at the same time as one of the lower NPN power transistors 47. Current then flows through two of the phases of the motor. The Hall-effect sensors 42 along with electronic logic within controller 44 determine which transistors to turn on in order to provide torque in the right direction to the magnet. The power supply, $V_C$, for the motor drive transistors and the power supply $V_L$, for the logic are often separate supplies and different voltages. For this reason, it is necessary to have level shift transistors 48 and 49 to drive the power transistors 46 and 47. In a typical application, $V_C$ might be 24 volts and $V_L$ might be 5 volts. In operation, driving pin 7, for example, turns on the NPN transistor 49. This pulls the base of transistor 46 to ground potential and turns 46 on hard, which is desirable for best operation of the motor. At the same time pin 7 goes high, pin 10, for example, would be driven high. This turns on a PNP transistor 48, which drives the base of a transistor 47 high, which turns transistor 47 on hard. Thus, driving pins 7 and 10 high causes phase A to be within a few tenths of a volt of $V_C$ and phase B to be very close to ground potential. Current will flow from A to B and the motor will rotate and provide torque as long as the Hall-effect signals and the logic are correct.

Instead of using drive circuit 40 for the control of motor 20, control can be provided by an MC33035 controller (not shown), sold by Motorola Inc. This controller integrates all of the functions necessary for brushless D.C. control, including decoding data from Hall-effect sensors, directional control, and a range of protective functions.

With reference to FIG. 5, there are shown torque-speed curves for motor 20 in a low-speed mode and in a high-speed mode and for a motor having a single coil. Curve 60 shows the torque-speed relationship for a motor with a single coil, such as the motor 10 shown in FIG. 2. Curve 62 shows the torque-speed curve for the high-speed coil 34 of motor 20, and curve 64 shows the torque-speed curve for the low-speed coil 30 of motor 20.

In the single-coil motor (curve 60), the current required for 50 oz-in of torque (point a on curve 60) is 21.4 amps, and the current required for 4 oz-in of torque (point b on curve 60) is 1.79 amps. The current of 21.4 amps, which is produced at a resistance R=0.07 ohms, is too high to be acceptable. If the resistance R is increased to, for example, 3.0 ohms, the high torque can be easily achieved with an acceptable current; however, the speed of the motor will then be too low at a torque of 4 oz-in. For high-speed coil 34, the current is 1.84 amps at 4 oz-in (point b on curve 62) which is an acceptable level. Further, the low-speed function can easily be provided by the low-speed coil 30, as illustrated by curve 64. In the use of low speed coil 30, the required torque of 50 oz-in (point a' on curve 64) is achieved with only 2.22 amps.

The invention has been described in detail with particular reference to certain embodiments thereof, but it will be understood that variations and modifications can be effected within the spirit and scope of the invention.

I claim:

1. An electric motor comprising:
   a generally planar rotor adapted to be rotated about an axis, said rotor being in a multipolar permanent magnet, said rotor being operable at a first condition of high torque and low speed encountered at startup and at a second condition of low torque and high speed encountered after startup;
   a generally planar stator having a support member with first and second axial sides and being axially spaced from said rotor;
   a first coil on said first axial side of said support member, said first coil having a number of windings sufficient for operating said rotor at said first condition;
   a second coil on said second axial side of said support member, said second coil having a number of windings sufficient for operating said rotor at said second condition; and
   means for driving said coils, said driving means including a first control circuit for driving said first coil and a second control circuit for driving said second coil, and means for actuating a selected one of said control circuits.

2. An electric motor, as defined in claim 1 wherein said first coil has a plurality of sector-shaped windings and said second coil has a plurality of sector-shaped windings.

3. An electric motor, as defined in claim 1, wherein said first coil is between said support and said rotor.

4. An electric motor, as defined in claim 1, wherein said motor is a three phase motor.

5. An electric motor, as defined in claim 1, wherein said motor is a brushless D.C. motor.

6. An electric motor, as defined in claim 1, wherein at said condition of high torque and low speed, the high torque is on the order of about 50 ounce-inches when the low speed is on the order of about 100 revolutions per minute.

7. An electric motor, as defined in claim 1, wherein at said condition of high speed and low torque, the high speed is on the order of about 10,000 revolutions per minute and the low torque is on the order of about 50 ounce-inches.

8. An electric motor, as defined in claim 1, wherein at said condition of high torque and low speed, the torque varies linearly from about 50 ounce-inches at 100 revolutions per minute to about 10 ounce-inches at 800 revolutions per minute.

9. An electric motor, as defined in claim 1, wherein at said condition of high speed and low torque, the torque varies linearly from about 4 ounce-inches at 10,000 revolutions per minute to about 50 ounce-inches at 6,000 revolutions per minute.

* * * * *